US010829216B2

(12) United States Patent
Holtorf

(10) Patent No.: US 10,829,216 B2
(45) Date of Patent: Nov. 10, 2020

(54) MONUMENT

(71) Applicant: Airbus Operations GmbH, Hamburg (DE)

(72) Inventor: Boris Holtorf, Pinneberg (DE)

(73) Assignee: Airbus Operations GmbH (DE)

( * ) Notice: Subject to any disclaimer, the term of this patent is extended or adjusted under 35 U.S.C. 154(b) by 378 days.

(21) Appl. No.: 15/874,027

(22) Filed: Jan. 18, 2018

(65) Prior Publication Data
US 2018/0208313 A1    Jul. 26, 2018

(30) Foreign Application Priority Data

Jan. 23, 2017   (DE) .................. 10 2017 101 225

(51) Int. Cl.
*B64D 11/04*       (2006.01)
*B64D 11/00*       (2006.01)

(52) U.S. Cl.
CPC .......... *B64D 11/0007* (2013.01); *B64D 11/04* (2013.01); *B64D 2011/0046* (2013.01)

(58) Field of Classification Search
CPC ............... B64D 11/0007; B64D 11/04; B64D 2011/0046; B64D 11/00; Y02T 50/46
USPC ....................................... 244/118.5
See application file for complete search history.

(56) References Cited

U.S. PATENT DOCUMENTS

| 7,780,114 B2 | 8/2010 | Doebertin et al. |
| 7,931,047 B2 | 4/2011 | Gonnsen et al. |
| 8,262,026 B2 | 9/2012 | Jaeger et al. |
| 2007/0110861 A1 | 5/2007 | Hoffjann et al. |
| 2008/0001031 A1* | 1/2008 | Doebertin ............. B64D 11/04 244/118.1 |
| 2009/0314889 A1 | 12/2009 | Baatz et al. |
| 2011/0007464 A1* | 1/2011 | Leigh .................. H01R 9/2408 361/679.01 |
| 2012/0160111 A1* | 6/2012 | Hozumi ................ B64D 11/04 99/474 |

FOREIGN PATENT DOCUMENTS

| DE | 102005007058 A1 | 8/2006 |
| DE | 102006023047 A1 | 11/2007 |
| DE | 102008006741 A1 | 8/2009 |

* cited by examiner

*Primary Examiner* — Christopher P Ellis
(74) *Attorney, Agent, or Firm* — Lerner, David, Littenberg, Krumholz & Mentlik, LLP

(57) ABSTRACT

A monument has a connection device, a fluid source and a compartment for the installation of a modular unit. The connection device is intended for connecting the fluid source to a modular unit installed in the compartment. The connection device includes two line sections. It is connected to the fluid source via one line section and can be connected to a modular unit via the other line section. The connection device is arranged so as to be displaced in the compartment on a predefined track between a connection position and an operating position. In the connection position the connection device is further from the rear end of the compartment than in the operating position. The connection device can be connected, in the connection position, via the second line section to a modular unit arranged outside the compartment. Also described is a system including a monument and a modular unit.

9 Claims, 2 Drawing Sheets

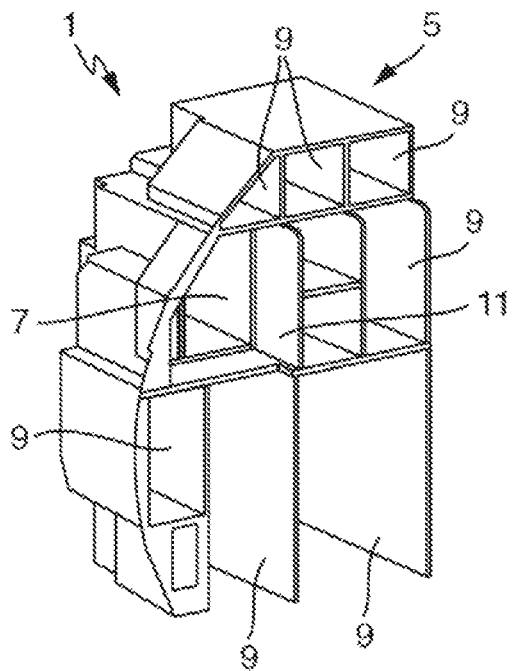 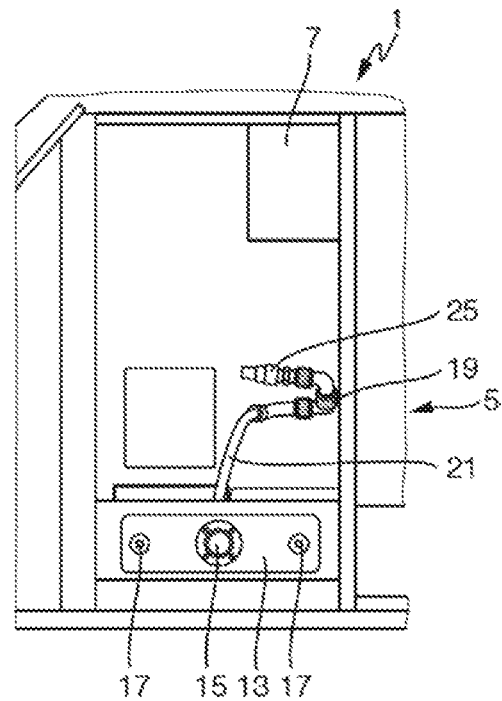
Fig. 1    Fig. 2
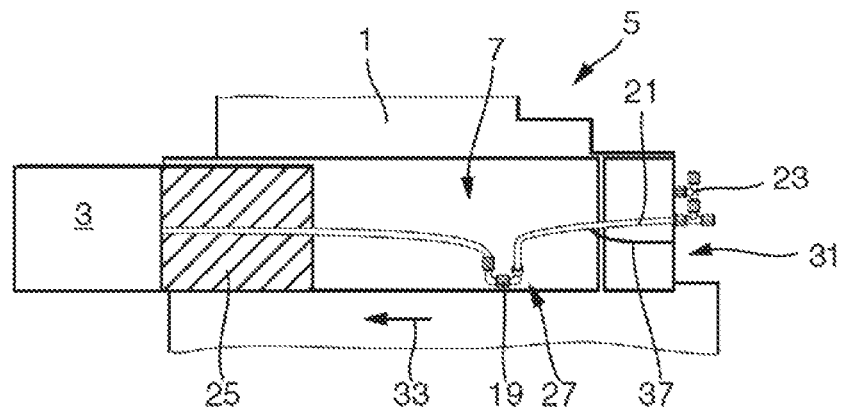
Fig. 3
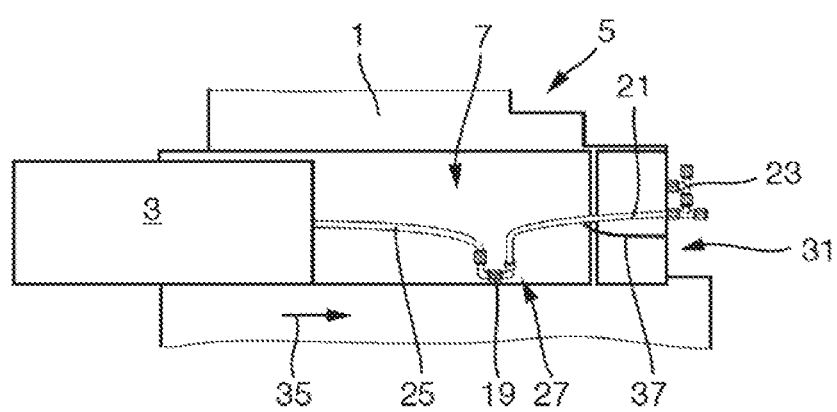
Fig. 4

MONUMENT

FIELD OF THE INVENTION

The present invention relates to a monument with a connection device, a fluid source and a compartment for the installation of a modular unit, wherein the connection device is intended for connecting the fluid source to a modular unit installed in the compartment and is arranged in the compartment. A modular unit for installation in the compartment can be introduced into the compartment with a translational movement in a direction towards a rear end of the compartment. The connection device comprises a first and a second line section, wherein the connection device is connected to the fluid source via the first line section and wherein the second line section is intended for connecting the connection device to a modular unit that is intended to be installed in the compartment.

BACKGROUND OF THE INVENTION

Aircraft galleys must be adapted to a wide variety of requirements depending on the aircraft type and also depending on the use of the aircraft. For example, the fitting-out of a galley for a short- and medium-range aircraft such as the Airbus A320 is subject to completely different requirements if this aircraft is to be used only on short-haul routes compared to the same aircraft being used for medium-haul flights. Therefore, the fitting-out of an aircraft galley must be as variable as possible. To that end, the monuments of aircraft galleys have a large number of compartments which can be equipped in a great many ways. An example of a galley is described in US 2009/314 889 A1. An example of a modular unit is a steam oven in which meals can be heated using hot steam.

In order to equip the aircraft galleys as smoothly and efficiently as possible, and also to permit interoperability across various aircraft types, there has become established a quasi-standard for the dimensions of the modules or modular units that can be installed in the monuments of the aircraft galleys. An example of such a standard is the dimensions of cabin trolleys that can be used in a great many aircraft types. This standard defines, in particular, the height and width of the compartments in the monuments, while the depth of the compartments may vary.

One result of this variability is for example the possibility of installing different-sized steam ovens in the same monument. This makes it possible to install, into the same compartment in a monument, a steam oven for 32 meals and a steam oven for 48 meals. To that end, the depth of the compartment is increased by means of additional wall extensions in order that the steam oven for 48 meals does not extend out from the compartment. Steam ovens are described for example in US 2007/110 861 A1.

The conventional steam oven must be connected to a water connection in order to be able to generate hot steam. To that end, a connection device is provided positionally fixed in the compartment, is connected via a first line section to a water connection and can be connected via a second line section to the steam oven. The length of the second line section is determined by the normal depth of compartments, that is to say compartments of which the depth has not been increased by means of wall extensions, and cannot readily be changed.

BRIEF SUMMARY OF THE INVENTION

Against this background, aspects of the present invention may simplify the installation of modular units in compartments of monuments if, for example, these modular units require connection to a water connection during installation.

In a first aspect, a monument has a connection device, a fluid source and a compartment for the installation of a modular unit. The connection device is intended for connecting the fluid source to a modular unit installed in the compartment and is arranged in the compartment. A modular unit for installation in the compartment can be introduced into the compartment with a translational movement in a direction towards a rear end of the compartment. The connection device comprises a first and a second line section. The connection device is connected to the fluid source via the first line section and the second line section is intended for connecting the connection device to a modular unit that is intended to be installed in the compartment. The connection device is arranged such that it can be displaced in the compartment on a predefined track between a connection position and an operating position. In the connection position the connection device is further from the rear end of the compartment than in the operating position. The connection device is connected to the fluid source via the first line section in the connection position and in the operating position. The connection device can be connected, in the connection position, via the second line section to a modular unit which is arranged outside the compartment and is intended for installation in the compartment.

In other words, the monument can for example be part of an aircraft galley but can also be used in other vehicles such as trains, for example. This monument has at least one compartment in which there is arranged a connection device. The connection device is designed to connect a fluid source, for example a water connection or a steam connection, to a modular unit that is intended for installation in the compartment. The modular unit can for example be a steam oven in which meals can be heated using hot steam.

The modular unit is in general a closed unit which, on installation in the compartment, must be connected to various supply connections. If the modular unit is a steam oven, it must for example be connected to an electricity supply and a water connection. The dimensions of the modular unit intended for installation in the compartment are generally matched exactly to the size of the compartment, that is to say the height, width and depth thereof, so that the compartment is completely filled by the modular unit when the latter is installed in the compartment. In order to introduce the modular unit into the compartment, the unit is generally installed in the compartment using a translatory movement, for example by displacement in the depth direction of the compartment. For that reason, the supply connections must be connected to the modular unit prior to introduction of the modular unit into the compartment, in so far as these are not connections that are established automatically. Automatic connections of this kind are known for example for electrical connections and some steam ovens.

It is provided, according to an aspect of the present invention, that the modular unit be connected to a fluid source. To that end, there is provided a connection device which is permanently connected to the fluid source via a first line section. A second line section makes it possible to establish a connection to a modular unit that is to be installed in the compartment of the monument.

In order to facilitate the connection of the second line section to the modular unit, the connection device is arranged such that it can be moved in the compartment. In particular, it can be displaced on a predefined path between an operating position and a connection position, wherein the connection device is connected via the first line section to the fluid source also in the operating position. The operating position is that position in which the connection device is positioned when the modular unit is securely installed in the compartment and is in operation. Releasable arresting or blocking means are preferably provided in order to secure the connection device in the operating position. For example, a latching mechanism can be provided which allows the connection device to be retained once displaced from the connection position to the operating position.

The connection position is chosen such that the connection device can be connected to a modular unit via the second line section even if this modular unit is located entirely outside the compartment. To that end, the connection device is further from the rear end of the compartment when in the connection position than when in the operating position. In other words, in order to connect the second line section to a modular unit, the connection device is displaced from the operating position, away from the rear end of the compartment and into the connection position. Then, in the connection position, the second line section is coupled to the modular unit and subsequently the connection device can be displaced back into the operating position. The connection position can for example be located in a region in the compartment which is filled by the modular unit when the modular unit is installed.

The monument advantageously simplifies the installation of modular units in a compartment of the monument, without this requiring modification of the second line section. Rather, the displaceable connection device makes it possible to establish a connection between the modular unit even if this is arranged outside the compartment and even if the length of the second line section was originally determined for a shallow compartment. Since the second line section can be retained unchanged, it is in practice possible to implement the invention at short notice since it is not necessary to reconfigure the predefined second line section. In addition, the first line section can be guided in a controlled manner owing to the predefined connection position and the predefined operating position, thus making it possible to avoid damage to the line section during installation or exchange of the modular unit in the compartment.

In one preferred embodiment, the connection device can be connected, in the connection position, only via the second line section to a modular unit which is arranged outside the compartment and is intended for installation in the compartment. This embodiment is particularly preferred because the second line section can be kept as short as possible, thus making it possible to avoid damage to the second line section during installation of a modular unit owing to excess length of the line section.

It is also preferred that the connection device can be displaced between the operating position and the connection position by means of a rail arrangement. A rail arrangement is particularly advantageous since it represents a space-saving way of moving the connection device on a predefined track between the operating position and the connection position without this requiring too much space for the guiding mechanism.

Preferably, the connection device can be arrested in an intermediate position between the connection position and the operating position. In other words, at least one intermediate position, which is closer to the rear end of the compartment than the connection position, is provided in addition to the connection position and the operating position. The connection device can be arrested or secured in this intermediate position. This advantageously permits the use of modular units of different depths in the same compartment. For the shallower modular units, the connection device can be secured in the intermediate position for operation of the modular unit. Thus, the modular unit need not be introduced fully into the compartment, so that the front side of the modular unit can for example finish flush with the front side of the monument and not be recessed in the compartment.

For example, the connection device, when introducing into the compartment a modular unit intended for installation in the compartment, can be displaced from the connection position into the operating position by engagement of the modular unit with the connection device. This is a particularly simple option for displacing the connection device from the connection position into the intermediate position or into the operating position without this requiring the intervention of an operative or installer between the modular unit and the connection device.

However, in a preferred alternative embodiment, it is provided that an additional displacement means, for example a suitable rod, is provided with which the connection device can be displaced from the connection position into the intermediate position or into the operating position once the second line section has been connected to the connection device. This permits controlled and reproducible positioning of the connection device, making it possible to ensure that the connection device has indeed been arrested in the operating position or in the intermediate position before the modular unit is finally secured for operation.

In one preferred embodiment, the monument has a return device in order to bring the first line section into a predefined position when the connection device is displaced on the predefined path from the connection position in the direction of the operating position. The return device can for example be a resiliently preloaded coil or also simply a resiliently preloaded cable that preloads the first line section to a certain point, so that when the connection device is displaced on the predefined track from the connection position to the intermediate position or to the operating position the first line section is returned in a controlled manner. This avoids damage for example due to friction, kinking or jamming of the first line section.

In another aspect, a system includes a monument according to one of the preceding embodiments and a modular unit, wherein the modular unit is intended for installation in the compartment and has a connection element for connection to the second line section. The fluid source is preferably a water connection and the modular unit is a steam oven for heating meals using hot steam.

The advantages and various possibilities for the configuration of the system according to the invention correspond to the advantages and embodiments of the respective monument employed in the context of the system.

BRIEF DESCRIPTION OF THE DRAWINGS

There follows a more detailed explanation of an exemplary embodiment of a monument according to the invention and of a system according to the invention with reference to the drawings, in which FIG. 1 shows a perspective view of an exemplary embodiment of a monument according to the invention, FIG. 2 shows a front view of a compartment in the exemplary embodiment of the monument according to the invention, FIG. 3 shows a section through the compartment of FIG. 2 along a horizontal plane, wherein a connection device is arranged in a connection position, FIG. 4 shows a section through the compartment of FIG. 2 along a horizontal plane, wherein the connection device is arranged in the connection position.

DETAILED DESCRIPTION

Figure 5:
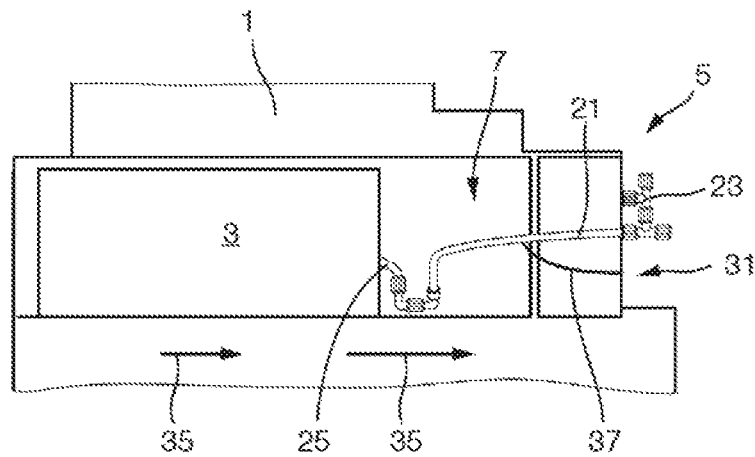
FIG. 5 shows a section through the compartment of FIG. 2 along a horizontal plane, wherein the connection device is arranged in the connection position.

FIG. 1 shows an exemplary embodiment of a monument 1 according to an embodiment of the invention which, together with a modular unit 3, forms a system 5 according to an embodiment of the invention. The modular unit 3 is shown only in FIGS. 3 to 7. The monument 1 is part of an aircraft galley which is not otherwise shown in greater detail.

The monument 1 comprises a plurality of compartments 7, 9 in which various modular units can be installed. The compartment labelled with the reference sign 7 will be described in greater detail below. However, this is a compartment 7 chosen merely by way of example. Aspects of the invention can be applied to any of the other compartments 9 of the monument 1. As shown in FIG. 1, the compartment 7 has been expanded by means of a wall extension 11, that is to say that the compartment 7 has been made deeper.

FIG. 2 shows a front view of the compartment 7, in which figure the viewpoint toward the compartment 7 corresponds to the depth direction of the compartment 7 and the observer is looking into the compartment 7 through the open front side of the compartment 7. Thus, FIG. 2 represents a detail of the monument 1 of FIG. 1.

In the compartment 7 there is an electrical supply module 13 which, via a plug connection 15, can supply electricity and data to a modular unit 3 installed in the compartment 7. The connection between the electrical supply module 13 and the modular unit 3 is established automatically when the modular unit 3 is pushed completely into the compartment 7. In order to correctly position the modular unit 3, the electrical supply module 13 has two recesses 17 for centering pins (not shown) with which the modular unit 3, on insertion into the compartment, is oriented with respect to the electrical supply module 13.

Furthermore, a movable connection unit 19 is shown in the compartment 7. The connection unit 19 can supply a modular unit 3 with water from a water tank. To that end, it is connected, via a first line section 21, to a water connection 23 which is an example of a fluid source. It is also for example conceivable that hot steam is supplied directly via the connection unit. The water connection 23 is shown only in FIGS. 3 to 7. The water connection 23 allows water to be taken from a water tank of the aircraft. The connection unit 19 also comprises a second line section 25 via which the connection unit 19 can be connected to the modular unit 3.

There follows a more detailed description of the configuration of the connection unit 19, with reference to FIGS. 3 to 6. FIG. 3 shows the connection unit 19 which is arranged in a connection position 27. To that end, it has been moved counter to the depth direction 33 away from the rear end 31 of the compartment 7, out of an operating position 29 in which the connection unit 19 is arranged in FIG. 6. As is clear from a comparison of FIG. 3 with FIG. 6, the connection position 27 is further from the rear end 31 of the compartment 7 than the operating position 29 (only shown in FIG. 6). In order to move the connection unit 19 back-and-forth on a predetermined track between the operating position 29 and the connection position 27, this unit is attached to a rail arrangement. The rail arrangement is not shown in the figures.

If the connection unit 19 is arranged in the connection position 27, this makes it possible for the second line section 25 to be connected to the modular unit 3 so long as this unit has not yet been introduced into the compartment 7, that is to say as long as the modular unit 3 is still arranged outside the compartment 7. As is clear from FIG. 3, the modular unit 3, which is shown only in part, is arranged completely outside the compartment 7. This makes it easier to connect the second line section 25 to the modular unit 3. Since the length of the second line section 25 cannot readily be changed, displacing the connection unit 19 into the connection position 27 provides an additional region (shown hatched in FIG. 3) in which the modular unit 3 can be arranged when the connection between the second line section 25 and the modular unit 3 is established.

In the present case, the modular unit 3 is a steam oven which is for example suitable for 48 meals. The steam oven is supplied, via the connection unit 19, with water which is evaporated in the steam oven for the purpose of heating the meals. The modular unit 3 has a connection for the second line section 25, which is not shown in the figures.

Figure 6:
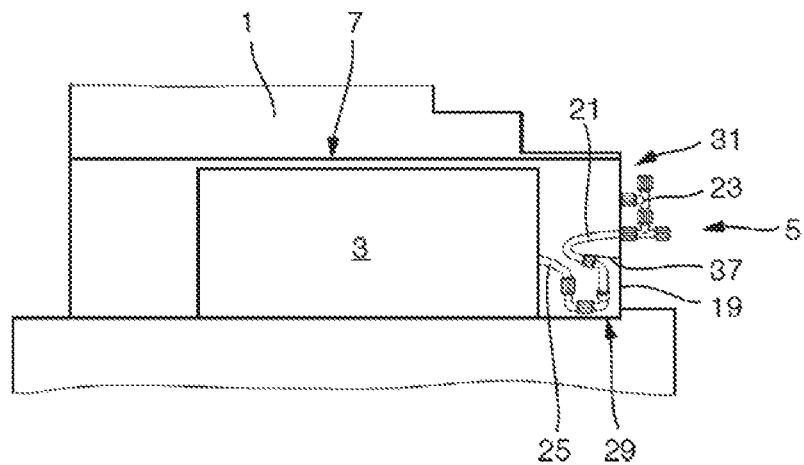
FIG. 6 shows a section through the compartment of FIG. 2 along a horizontal plane, wherein the connection device is arranged in an operating position.

FIGS. 4 to 6 show how the modular unit 3 is inserted into the compartment 7 in the depth direction 35 towards the rear end 31, until, in FIG. 6, it is arranged fully in the compartment 7 and can be taken into service. In that context, the connection unit 19 is displaced by engagement with the modular unit 3 from the connection position 27 into the operating position 29, where an arresting mechanism releasably secures the connection unit 19. The arresting mechanism is not shown in the figures.

FIGS. 3 to 6 schematically show a return device 37 by means of which the first line section 21 is guided into a predefined position when the connection unit 19 is guided from the connection position 27 into the operating position 29. The return device shown in the figures is a simple cable which is preloaded by a spring.

Figure 7:
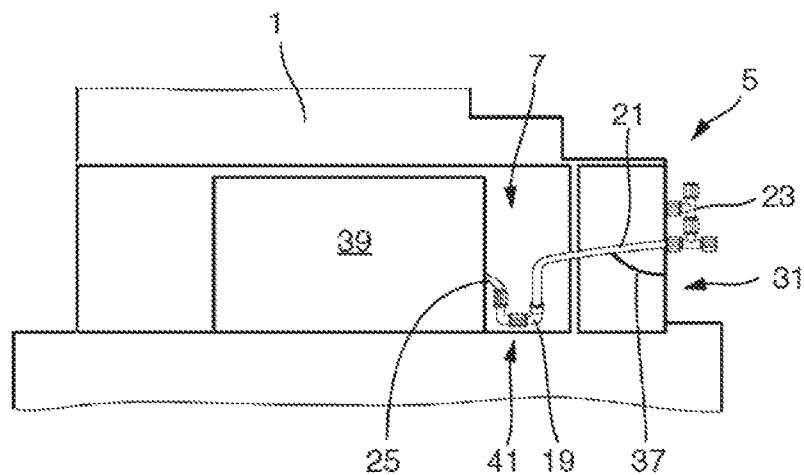
FIG. 7 shows a section through the compartment of FIG. 2 along a horizontal plane, wherein the connection device is arranged in an intermediate position.

Finally, FIG. 7 shows that it is also possible for another modular unit 39 to be positioned in the compartment 7. The modular unit 39 is a steam oven which is configured only for 32 meals and is therefore shallower than the steam oven for 48 meals. In order that this steam oven need not be arranged deeper in the compartment 7 than the deeper steam oven for 48 meals from FIGS. 3 to 6, as seen from the front side of the compartment 7, the connection unit 19 can advantageously be arrested in an intermediate position 41.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A monument with a connection device, a fluid source and a compartment for the installation of a modular unit, wherein the connection device is configured for connecting the fluid source to the modular unit installed in the compartment and is arranged in the compartment,
   wherein the modular unit for installation in the compartment is configured to be introduced into the compartment with a translational movement in a direction towards a rear end of the compartment,
   wherein the connection device comprises a first and a second line section, wherein the connection device is connected to the fluid source via the first line section and wherein the second line section is intended for connecting the connection device to the modular unit that is intended to be installed in the compartment such that the first line section is in communication with the second line section via the connection device,
   wherein the connection device is arranged such that the connection device can be displaced in the compartment on a predefined track between a connection position and an operating position, wherein in the connection position the connection device is further from the rear end of the compartment than in the operating position,
   wherein the connection device is connected to the fluid source via the first line section in the connection position and in the operating position and
   wherein the connection device is configured to be connected, in the connection position, via the second line section to the modular unit arranged outside the compartment and configured for installation in the compartment.

2. The monument according to claim 1, wherein the connection device is configured to be connected, only in the connection position, via the second line section to the modular unit arranged outside the compartment and configured for installation in the compartment.

3. The monument according to claim 1, wherein the connection device is configured to be displaced between the operating position and the connection position by a rail arrangement.

4. The monument according to claim 1, wherein the connection device is configured to be arrested in an intermediate position between the connection position and the operating position.

5. The monument according to claim 1, wherein the connection device, when the modular unit configured for installation in the compartment is introduced into the compartment, is configured to be displaced from the connection position into the operating position by engagement of the modular unit with the connection device.

6. The monument according to claim 1, wherein the fluid source is a water connection.

7. The monument according to claim 1, wherein the monument has a return device to bring the first line section into a predefined position when the connection device is displaced on the predefined path from the connection position in the direction of the operating position.

8. A system comprising:
   a monument according to claim 1; and
   the modular unit,
   wherein the modular unit is configured for installation in the compartment and has a connection element for connection to the second line section.

9. The system according to claim 8, wherein the fluid source is a water connection and the modular unit is a steam oven for heating meals using hot steam.

* * * * *